United States Patent
Horowitz et al.

(10) Patent No.: US 11,509,548 B1
(45) Date of Patent: Nov. 22, 2022

(54) ADAPTIVE EXPONENTIAL MOVING AVERAGE FILTER

(71) Applicant: Google LLC, Mountain View, CA (US)

(72) Inventors: Michael Horowitz, Austin, TX (US); Philip Eliasson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/305,945

(22) Filed: Jul. 16, 2021

(51) Int. Cl.
*H04L 43/028* (2022.01)
*H04L 67/141* (2022.01)
*H04L 12/54* (2022.01)
*H04L 12/70* (2013.01)

(52) U.S. Cl.
CPC ........ *H04L 43/028* (2013.01); *H04L 12/5601* (2013.01); *H04L 67/141* (2013.01); *H04L 2012/5616* (2013.01)

(58) Field of Classification Search
CPC . H04L 43/028; H04L 12/5601; H04L 67/141; H04L 2012/5616
See application file for complete search history.

(56) References Cited

U.S. PATENT DOCUMENTS

| | | | | |
|---|---|---|---|---|
| 2014/0050081 A1* | 2/2014 | Wagner | ................... | H04L 43/16 370/230 |
| 2014/0243041 A1* | 8/2014 | Zhao | ....................... | H04L 47/25 455/552.1 |
| 2017/0134867 A1* | 5/2017 | Miyasaka | ............ | H04R 25/353 |
| 2017/0330574 A1* | 11/2017 | Johnston | ................ | G10L 19/04 |
| 2018/0152360 A1* | 5/2018 | Norum | .................. | H04L 43/028 |
| 2019/0050414 A1* | 2/2019 | Maturana | .................. | G06F 8/38 |

* cited by examiner

*Primary Examiner* — Michael A Keller
*Assistant Examiner* — Thao D Duong
(74) *Attorney, Agent, or Firm* — Hontgman LLP; Brett A. Krueger

(57) ABSTRACT

A method includes establishing communication between a first user device and a second user device using a first codec and filtering an input signal indicating an estimated unfiltered available bandwidth for the communications by applying a current filter including one of a first filter when the estimated unfiltered available bandwidth is less than a first threshold value or greater than a second threshold value or a second filter when the estimated unfiltered available bandwidth is between and including the first and second threshold values. The method includes adaptively switching the current filter as a function of the filtered input signal and the first and second threshold values. When the filtered input signal satisfies a channel bandwidth threshold for at least a predetermined period of time, the method includes switching from using the first codec to using a second codec for the communication between the first and second user devices.

24 Claims, 8 Drawing Sheets

ADAPTIVE EXPONENTIAL MOVING AVERAGE FILTER

TECHNICAL FIELD

This disclosure relates to adaptive filters such as adaptive exponential moving average filters.

BACKGROUND

Filters such as exponential moving average filters are commonly used to "smooth" noisy signals. Exponential moving average filters can provide excellent smoothing with low computational complexity. Weak filters allow the output of the filter to closely track the input without significant smoothing. In contrast, strong filters substantially smooth the output of the filter such that there can be significant delay in convergence between the input and the output of the filter.

SUMMARY

One aspect of the disclosure provides a computer-implemented method that, when executed by data processing hardware, causes the data processing hardware to perform operations. The operations include establishing digital communication between a first user device and a second user device using a first codec. The operations also include filtering an input signal indicating an estimated unfiltered available bandwidth for the digital communication by applying a current filter including one of (i) a first filter to filter the input signal when the estimated unfiltered available bandwidth is less than a first threshold value or greater than a second threshold value or (ii) a second filter to filter the input signal when the estimated unfiltered available bandwidth is between and including the first threshold value and the second threshold value. The operations include adaptively switching the current filter applied to filter the input signal between the first filter and the second filter as a function of the filtered input signal, the first threshold value, and the second threshold value. The operations include determining whether the filtered input signal satisfies a channel bandwidth threshold. When the filtered input signal satisfies the channel bandwidth threshold for at least a predetermined period of time, the operations include switching from using the first codec to using the second codec for the digital communication between the first user device and the second user device.

Implementations of the disclosure may include one or more of the following optional features. In some implementations, the operations further include, when the current filter applied to filter the input signal includes the first filter, determining that the filtered input signal rises to a value equal to or greater than the first threshold value, wherein adaptively switching the current filter applied to filter the input signal includes switching from applying the first filter to applying the second filter to filter the input signal. In some examples, the operations further include, when the current filter applied to filter the input signal includes the first filter, determining that the filtered input signal drops to a value equal to or less than the second threshold value, wherein adaptively switching the current filter applied to filter the input signal includes switching from applying the first filter to applying the second filter to filter the input signal.

Optionally, the operations further include, when the current filter applied to filter the input signal includes the second filter, determining that the filtered input signal drops to a value less than the first threshold value, wherein adaptively switching the current filter applied to filter the input signal includes switching from applying the second filter to applying the first filter to filter the input signal. The operations may further include, when the current filter applied to filter the input signal includes the second filter, determining that the filtered input signal rises to a value greater than the second threshold value, wherein adaptively switching the current filter applied to filter the input signal includes switching from applying the second filter to applying the first filter to filter the input signal.

In some implementations, the first filter is associated with a stronger filter strength than the second filter. Optionally, the channel bandwidth threshold is less than the first threshold value. The second codec may be capable of producing a high-quality signal using less available bandwidth than the first codec and the filtered input signal may satisfy the channel bandwidth threshold when the filtered input signal falls below the channel bandwidth threshold for the predetermined period of time. In some examples, the first codec and the second code are each an audio codec or a video codec.

The operations may further include, after switching from using the first codec to using the second codec for the digital communication between the first user device and the second user device, determining whether the filtered input signal satisfies a second channel bandwidth threshold and, when the filtered input signal satisfies the second channel bandwidth threshold for at least a second predetermined period of time, switching from using the second codec to using the first codec for the digital communication between the first user device and the second user device. In some examples, the filtered input signal satisfies the second channel bandwidth threshold when the filtered input signal is above the second threshold value. In some implementations, the operations further include determining the input signal satisfies a clipping threshold and, in response to determining the input signal satisfies the clipping threshold, adjusting the input signal to a clipped value.

Another aspect of the disclosure provides data processing hardware and memory hardware in communication with the data processing hardware. The memory hardware stores instructions that when executed on the data processing hardware cause the data processing hardware to perform operations. The operations include establishing digital communication between a first user device and a second user device using a first codec. The operations also include filtering an input signal indicating an estimated unfiltered available bandwidth for the digital communication by applying a current filter including one of (i) a first filter to filter the input signal when the estimated unfiltered available bandwidth is less than a first threshold value or greater than a second threshold value or (ii) a second filter to filter the input signal when the estimated unfiltered available bandwidth is between and including the first threshold value and the second threshold value. The operations include adaptively switching the current filter applied to filter the input signal between the first filter and the second filter as a function of the filtered input signal, the first threshold value, and the second threshold value. The operations include determining whether the filtered input signal satisfies a channel bandwidth threshold. When the filtered input signal satisfies the channel bandwidth threshold for at least a predetermined period of time, the operations include switching from using the first codec to using the second codec for the digital communication between the first user device and the second user device.

This aspect may include one or more of the following optional features. In some implementations, the operations further include, when the current filter applied to filter the input signal includes the first filter, determining that the filtered input signal rises to a value equal to or greater than the first threshold value, wherein adaptively switching the current filter applied to filter the input signal includes switching from applying the first filter to applying the second filter to filter the input signal. In some examples, the operations further include, when the current filter applied to filter the input signal includes the first filter, determining that the filtered input signal drops to a value equal to or less than the second threshold value, wherein adaptively switching the current filter applied to filter the input signal includes switching from applying the first filter to applying the second filter to filter the input signal.

Optionally, the operations further include, when the current filter applied to filter the input signal includes the second filter, determining that the filtered input signal drops to a value less than the first threshold value, wherein adaptively switching the current filter applied to filter the input signal includes switching from applying the second filter to applying the first filter to filter the input signal. The operations may further include, when the current filter applied to filter the input signal includes the second filter, determining that the filtered input signal rises to a value greater than the second threshold value, wherein adaptively switching the current filter applied to filter the input signal includes switching from applying the second filter to applying the first filter to filter the input signal.

In some implementations, the first filter is associated with a stronger filter strength than the second filter. Optionally, the channel bandwidth threshold is less than the first threshold value. The second codec may be capable of producing a high-quality signal using less available bandwidth than the first codec and the filtered input signal may satisfy the channel bandwidth threshold when the filtered input signal falls below the channel bandwidth threshold for the predetermined period of time. In some examples, the first codec and the second code are each an audio codec or a video codec.

The operations may further include, after switching from using the first codec to using the second codec for the digital communication between the first user device and the second user device, determining whether the filtered input signal satisfies a second channel bandwidth threshold and, when the filtered input signal satisfies the second channel bandwidth threshold for at least a second predetermined period of time, switching from using the second codec to using the first codec for the digital communication between the first user device and the second user device. In some examples, the filtered input signal satisfies the second channel bandwidth threshold when the filtered input signal is above the second threshold value. In some implementations, the operations further include determining the input signal satisfies a clipping threshold and, in response to determining the input signal satisfies the clipping threshold, adjusting the input signal to a clipped value.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
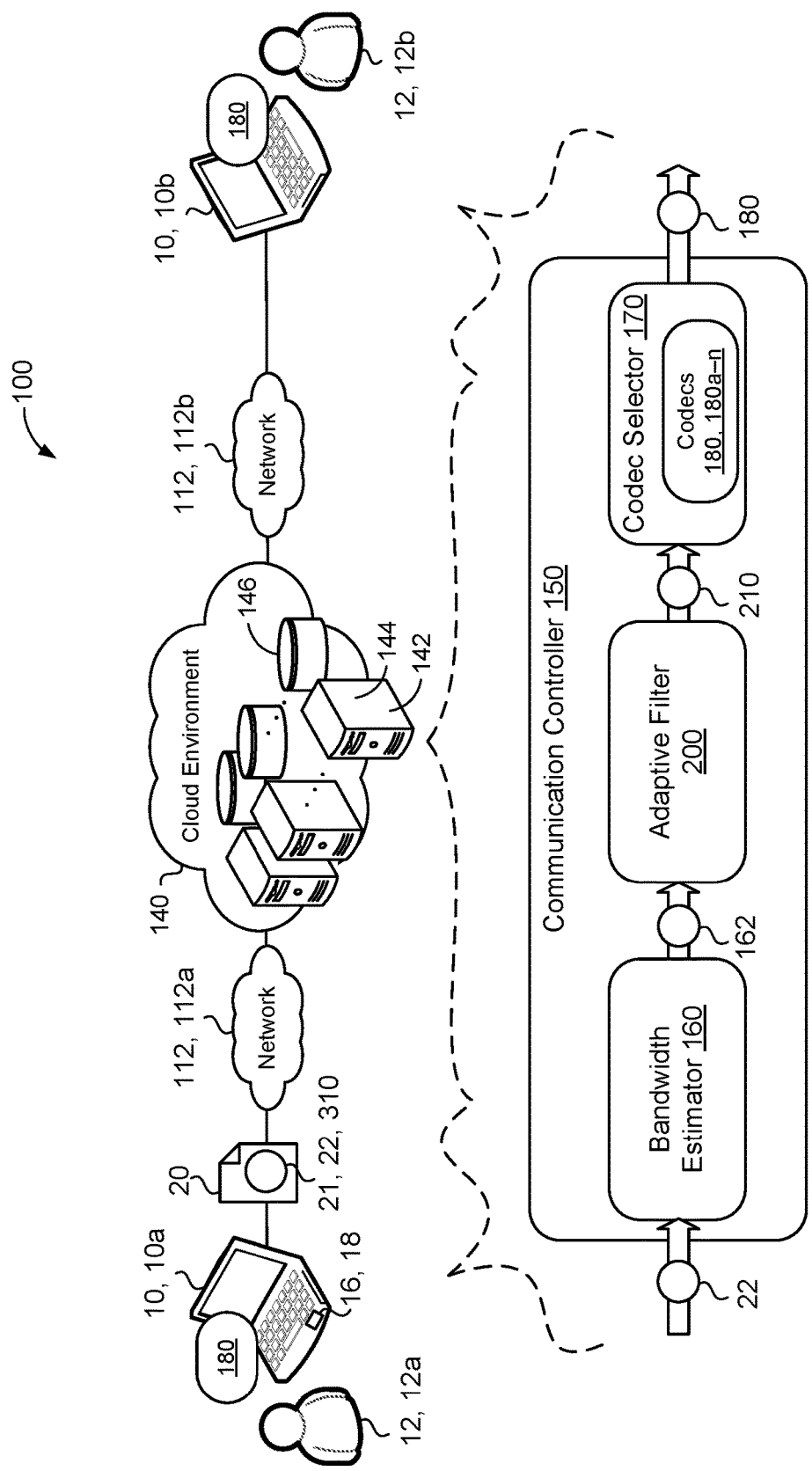
FIG. 1 is a schematic view of an example system for real time communication using an adaptive filter.

In many communication applications, such as a video chat or video conferencing applications between user devices, the available bandwidth of the communications between the user devices can vary dramatically during communication. The codec used to encode and/or decode the communication data can have a significant effect on the quality of the communications based on the available bandwidth. For example, a first codec (e.g., the encoder and/or decoder) may require a significant amount of bandwidth but require relatively small amounts of computational power (e.g., to save battery power), while a second codec may be capable of producing a high-quality signal using less bandwidth but require more computational power than the first codec. In this example, it is advantageous to use the first codec to save computational power when the available bandwidth is sufficiently high to support the first codec without impacting communication quality. Similarly, it is advantageous to switch to the second codec when the available bandwidth falls to a level where the communication using the first codec is no longer satisfactory. Thus, in some systems, when the available bandwidth is at or above a first threshold, the system uses a first codec (e.g., a high bandwidth and low computational power codec) and when the available bandwidth is at or below a second threshold, the system uses a second codec (e.g., a low bandwidth and high computational power codec).

However, estimating the available bandwidth between the user devices often leads to a noisy signal with rapid changes both up and down. Basing decisions on the noisy estimated available bandwidth (e.g., when to switch codecs) can lead to oscillation or changes based on spurious movement in the estimated available bandwidth, which is not ideal. Filtering the estimated available bandwidth signal and basing decisions instead on the filtered available bandwidth can "smooth" the input signal and help remove spurious spikes and dips. For example, an exponential moving average (EMA) filter often provides excellent smoothing results with low computational complexity.

Many filters have an associated "strength" or an amount of smoothing that the filter provides. For instance, a strong filter offers significant smoothing (i.e., the output of the filter slowly tracks the input) while a weak filter offers minimal smoothing (i.e., the output of the filter rapidly tracks the input). Referring again to EMA filters, adjusting the coefficients of the filter can make the filter stronger or weaker accordingly. Applying such filters to the codec switching problem, when a strong filter is applied to the estimated available bandwidth signal (e.g., a strong EMA filter), and the estimated bandwidth changes significantly for reasons other than noise, convergence to the new bandwidth value can be unacceptably slow and thus the user experiences a prolonged degraded experience. On the other hand, when a weak filter is applied to the estimated available bandwidth signal (e.g., a weak EMA filter), the convergence time is improved, however the estimated available bandwidth may not be sufficiently smoothed to mitigate noise.

Implementations herein describe a communication controller that adaptively selects or modifies a filter as a function of its input signal value. For example, the communication controller may assist in establishing digital communications between a first user device and a second user device. The communication controller may determine whether the user devices should use a first codec or a second codec based on a filtered estimated available bandwidth signal. The communication controller filters the estimated available bandwidth signal using a filter with a strength dependent upon the unfiltered estimated available bandwidth signal. For example, the communication controller uses a strong filter when the estimated available bandwidth is less or equal to a first threshold or greater than or equal to a second threshold. In the same example, the communication controller uses a weak filter when the estimated available bandwidth is greater than the first threshold and less than the second threshold (i.e., between the first threshold and the second threshold).

Referring to FIG. 1, in some implementations, an example system 100 includes two or more user devices 10, 10a-n, each associated with a respective user 12, 12a-n and each in communication with a remote system 140 via a network 112, 112a-n. The user devices 10 may correspond to any computing device, such as a desktop workstation, a laptop workstation, or a mobile device (e.g., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. The remote system 140 is configured to receive and transmit a video and/or voice data signal, such as that associated with a Voice over Internet Protocol (VoIP) call or a video chat application, between user devices 10, 10a-b through the networks 112, 112a-b. Therefore, a first caller 12a using a first user device 10a may place a phone call or video call (e.g., send a communication request 21) to a second user device 10b through remote system 140. The user devices 10, 10a-b communicate by sending a digital communication data signal through the network 112, 112a-b to the remote system 140. The communication data signal is split into a series of packets 20, via, for example, the TCP/IP or UDP protocol, with each packet 20 including representations of one or more audio/video samples 22 of the communication signal from the respective user device 10.

The remote system 140 or the user devices 10 execute a communications controller 150 to select a codec 180 (e.g., a video codec, an audio codec, etc.) from two or more codecs 180, 180a-n to encode and/or decode the audio/video samples 22 of the communication between the user devices 10. Different codecs 180 may be more appropriate for different available bandwidth scenarios. For example, one codec 180 may require low computational power, but be relatively bandwidth-intensive, while a different codec 180 may be less bandwidth-intensive, but require relatively more computational power. Thus, the communication controller 150 selects a codec 180 based, at least in part, on an estimated available bandwidth between the first user device 10a and the second user device 10b.

The communication controller may establish digital communication between the first user device 10a and the second user device 10b (e.g., via a digital communication channel such as a video communication channel) using an initial or first codec 180. The first codec 180 may be an initial or default codec 180 that the communication controller 150 assigns the user devices 10 for initial communication. For example, the communication controller 150 may select the first codec 180 based on an initial bandwidth estimate, user preferences, or any other factors. Alternatively, the communication controller 150 selects the first codec 180 using a filtered available bandwidth signal 210 as described in more detail below.

The communication controller 150 includes a bandwidth estimator 160 that estimates the available bandwidth 162 between the user devices 10. The bandwidth estimator 160 may receive the packets 20 and/or any other parameters of the communication between the user devices to estimate the available bandwidth, such as by measuring latency, throughput, etc. The estimated available bandwidth 162 indicates a maximum rate of data transfer between the user devices 10 (e.g., in bytes or bits per second).

The communication controller 150 also includes an adaptive filter 200. As discussed in more detail below, the adaptive filter 200 adaptively filters the estimated available bandwidth 162 to generate a filtered available bandwidth 210. Based on the filtered available bandwidth 210, a codec selector 170 selects an appropriate codec 180, 180a-n from among a plurality of codecs 180 for the user devices 10 to implement when communicating (i.e., to encode/decode the communication data) with one another. For example, the codec selector 170 determines whether the filtered available bandwidth 210 satisfies a channel bandwidth threshold. When the filtered available bandwidth 210 does satisfy the channel threshold (e.g., for a predetermined period of time), the codec selector 170 changes or modifies the codec 180 that the user devices 10 are using to communicate. For example, the communication controller 150 modifies the existing digital communication channel or establishes a new (i.e., a second) digital communication channel using a second codec 180 that is better adapted to the current available bandwidth than the first codec 180.

Figure 2:
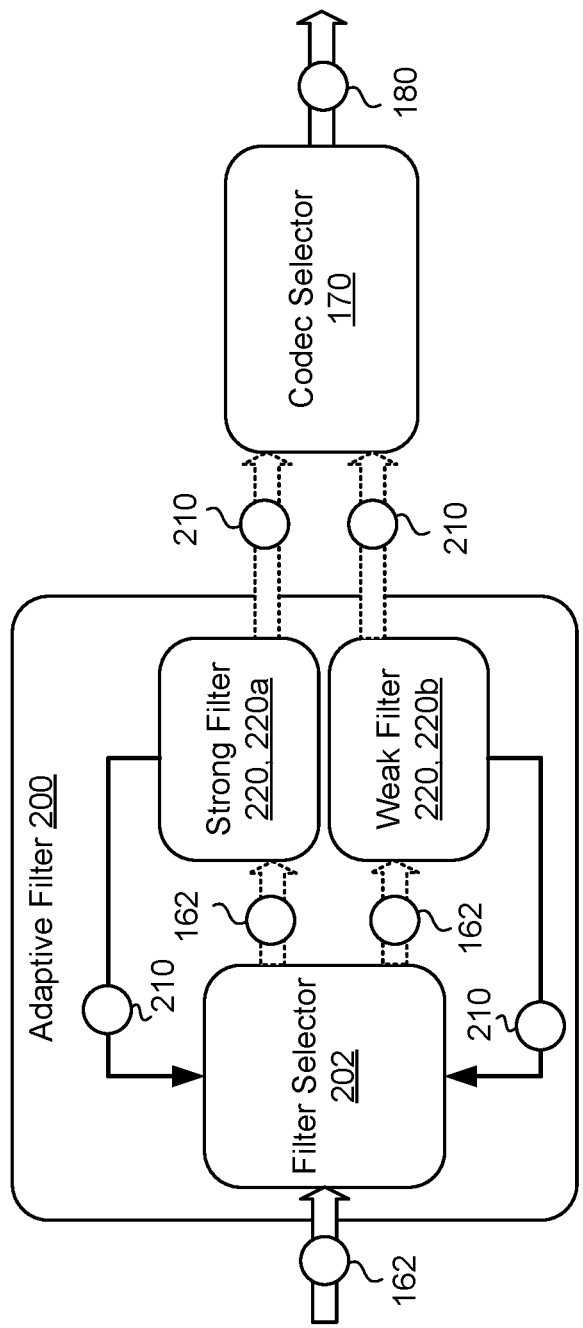
FIG. 2 is a schematic view of exemplary components of the system of FIG. 1.

Referring now to FIG. 2, the adaptive filter 200 receives the estimated available bandwidth 162 from the bandwidth estimator 160. The adaptive filter 200 includes a filter selector 202 that selects from among two or more filters 220, 200a-n to use to filter the estimated available bandwidth 162. In this example, the adaptive filter 200 includes a first filter 220a (i.e., a strong filter) and a second filter 220b (i.e., a weak filter), however it is understood that the adaptive filter 200 may select from any number of filters 220. The filter selector 202 initially selects one of the available filters 220 based on, for example, the unfiltered estimated available bandwidth 162 or other default or initial settings or parameters (e.g., user preference, etc.). After selecting the initial filter 220, the adaptive filter 200 filters the estimated available bandwidth 162 using the selected filter 220 and provides the filtered available bandwidth 210 to the codec selector 170, which the codec selector 170 uses to determine the current codec 180 for the user devices 10.

The filtered available bandwidth 210 is also provided back to the filter selector 202. The filter selector 202, based on the filtered available bandwidth 210, adaptively switches the current filter 220 applied to filter the estimated available bandwidth 162. In some examples, the filter selector 202 adaptively switches the current filter 220 using the filtered available bandwidth 210, and one or more thresholds 310, 310a-n (FIG. 3). For example, the filter selector 202 determines that the filtered available bandwidth 210 rises to a value equal to or greater than a first threshold value 310a and adaptively switches the current filter 220 from the first filter 220a to the second filter 220b to filter the estimated available bandwidth 162. Similarly, the filter selector 202 may determine that the filtered available bandwidth 210 drops to a value equal to or less than a second threshold value 310b and adaptively switches the current filter 220 applied to filter the estimated available bandwidth 162 from the first filter 220a to the second filter 220b to filter the estimated available bandwidth 162.

In yet another example, when the current filter 220 applied by the filter selector 202 to filter the estimated available bandwidth 162 is the second filter 220b, the filter selector 202 may determine that the filtered available bandwidth 210 drops to a value less than the first threshold value 310a and adaptively switch the current filter 220 from the second filter 220b to the first filter 220a to filter the estimated available bandwidth 162. Likewise, when the current filter 220 applied by the filter selector 202 to filter the estimated available bandwidth 162 is the second filter 220b, the filter selector 202 may determine that the filtered available bandwidth 210 rises to a value greater than the second threshold value 310b and adaptively switch the current filter 220 from the second filter 220b to the first filter 220a to filter the estimated available bandwidth 162.

While examples herein describe the adaptive filter 200 as adaptively switching between two filters 220 (e.g., where the first filter 220a is associated with a stronger filter strength than the second filter 220b) based on two threshold values 310a, 310b and the filtered available bandwidth 210, it is understood that the adaptive filter 200 may adaptively filter any input signal using any number of filters 220 and any number of threshold values 310. For example, the adaptive filter 200 filters an input signal (e.g., any signal that requires smoothing) using three or more filters 220 and three or more threshold values 310. The filtered output signal may be used for any sort of decision making, such as selecting a codec 180 from among two or more codecs 180.

Figure 3A:
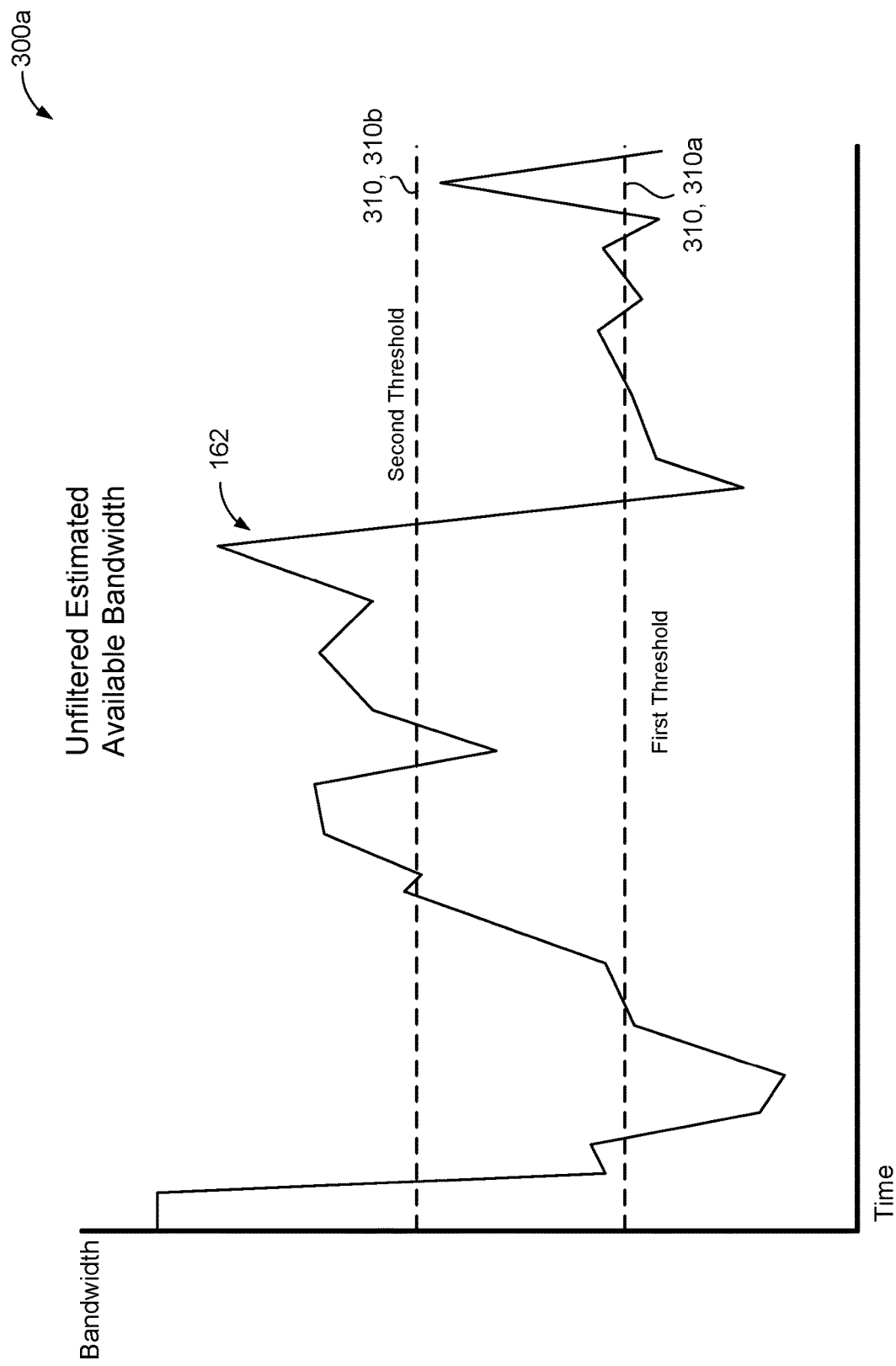
FIGS. 3A-3D are schematic views of plots of unfiltered and filtered estimated available bandwidth signals.

Referring now to FIG. 3A, a plot 300a with an x-axis representing time and a y-axis representing bandwidth plots an exemplary unfiltered estimated available bandwidth signal 162 with respect to the first threshold value 310a and the second threshold value 310b. In this example, when the user devices 10 are communicating using a first codec 180 and the estimated available bandwidth 162 falls below the first threshold value 310a for a predetermined period of time, the communication controller 150 should switch to using a second codec (e.g., a low-bandwidth codec 180). Similarly, when the user devices 10 are communicating via the second codec 180 and the estimated available bandwidth 162 rises above the second threshold value 310b for a predetermined period of time, the communication controller 150 should switch back to using the first codec 180 (e.g., a high-bandwidth codec 180). However, the unfiltered estimated available bandwidth 162 is noisy and leads to sub-optimal codec switching.

Figure 3B:
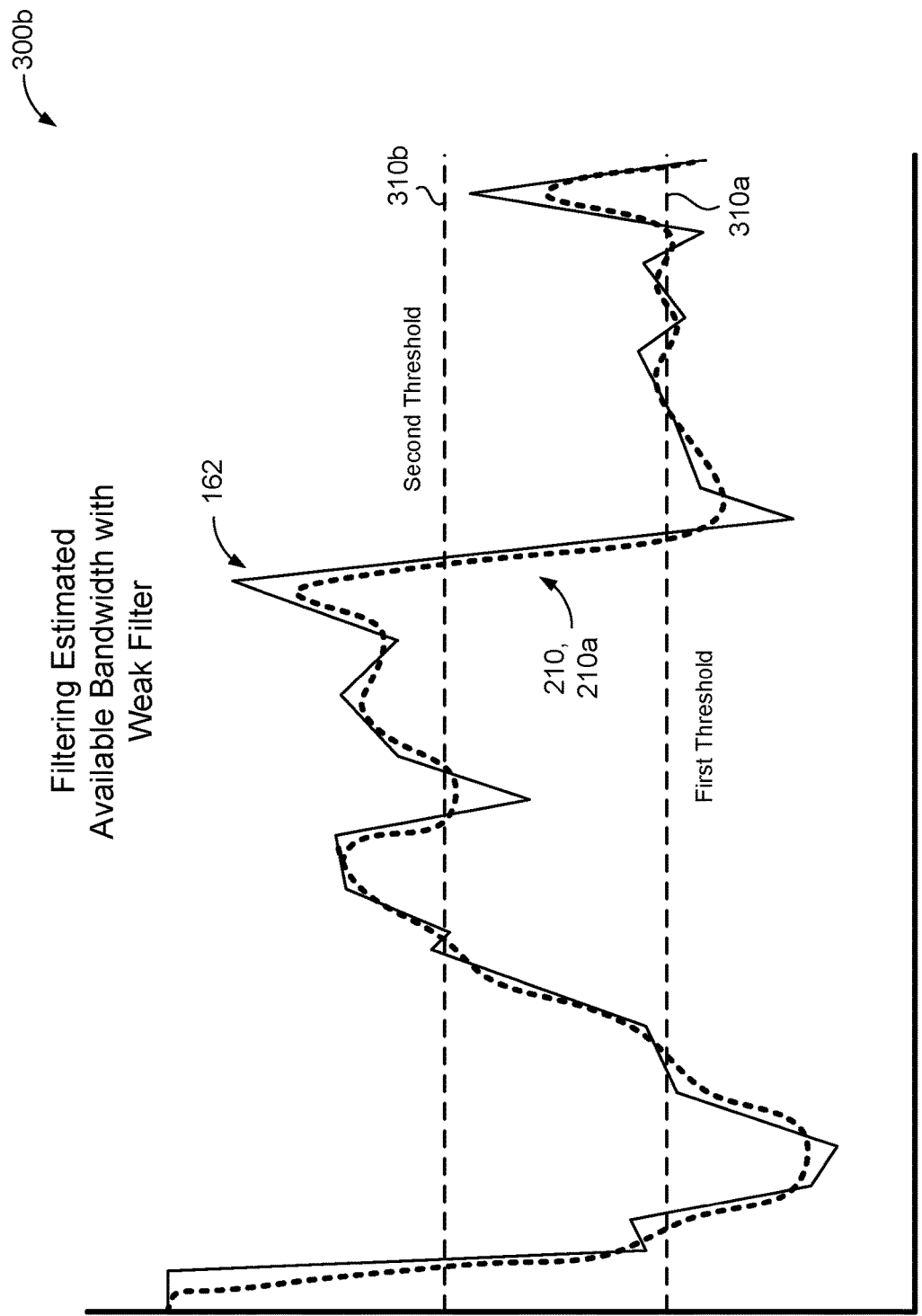
Figure 3C:
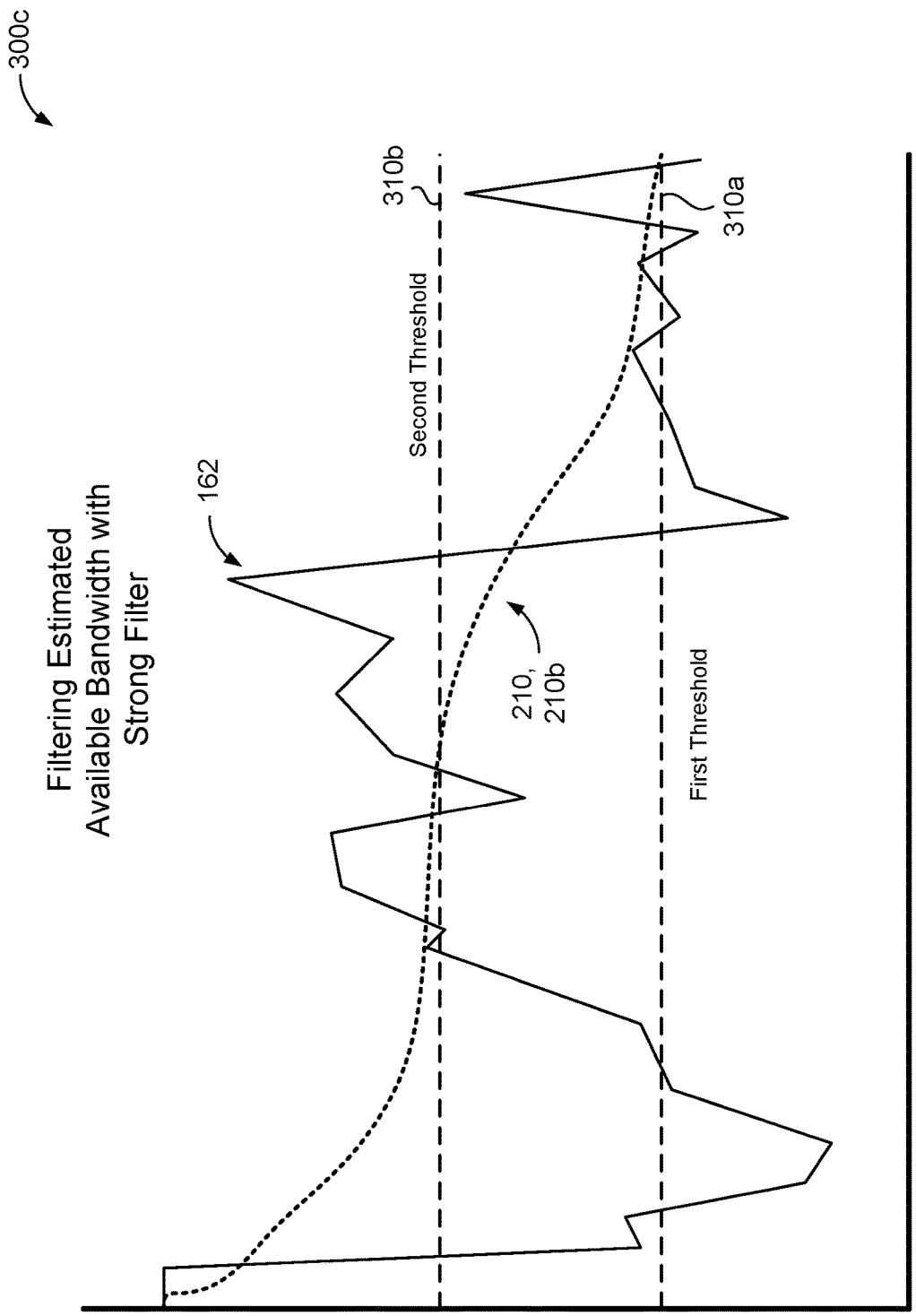

Referring now to FIG. 3B, a plot 300b plots the same exemplary unfiltered estimated available bandwidth signal 162 from FIG. 3A and also plots a filtered available bandwidth signal 210a (dashed line) filtered using the weak filter 220b. However, due to the weakness of the filter 220b, the spurious noise spikes below the first threshold value 310a and above the second threshold value 310b are still present (i.e., are not sufficiently smoothed), causing undesirable codec switching. FIG. 3C includes a plot 300c that plots the same exemplary unfiltered estimated available bandwidth signal 162 from FIGS. 3A and 3B and also plots a filtered available bandwidth signal 210b (dashed line) filtered using the strong filter 220a. Here, due to the strength of the filter 220a, the spurious noise spikes are sufficiently smoothed, however the filtered available bandwidth signal 210b adapts very slowly to the input signal, thereby missing or delaying potential codec switching events.

Figure 3D:
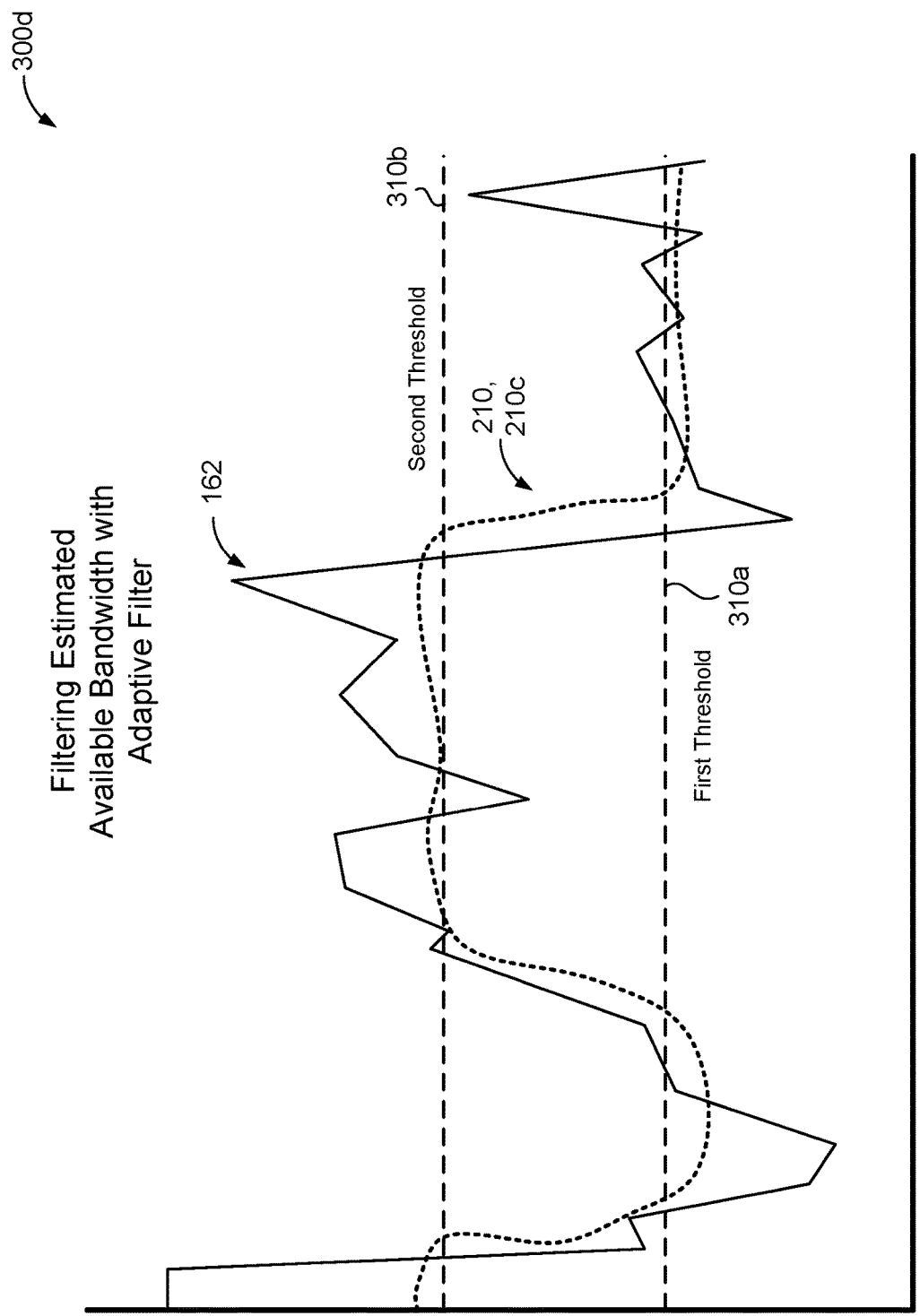

Referring now to FIG. 3D, a plot 300d plots the same exemplary unfiltered estimated available bandwidth signal 162 from FIGS. 3A-3C and also plots a filtered available bandwidth signal 210c (dashed line) filtered using adaptive filtering (i.e., a combination of the strong filter 220a and the weak filter 220b). Here, the adaptive filter 200 applies the strong filter 220a when the filtered available bandwidth 210 is less than (or less than or equal to) the first threshold value 310a or greater than (or greater than or equal to) the second threshold value 310b. The adaptive filter 200 applies the weak filter 220b when the filtered available bandwidth 210 is greater than (or greater than or equal to) the first threshold value 310a and less than (or less than or equal to) the second threshold value 310b. Thus, the spurious noise is sufficiently suppressed while still allowing the filtered available bandwidth 210 to rapidly respond to potential codec switching events.

Thus, in this example, the channel bandwidth threshold (i.e., the value the codec selector 170 uses to determine when to switch codecs 180) may be the same or less than the first threshold value 310a when the current codec 180 is a first codec 180 or a high-bandwidth codec 180 and the channel bandwidth threshold may be the same or greater than the second threshold value 310b when the current codec 180 is a second codec 180 or a low-bandwidth codec 180 (i.e., a codec 180 that requires less available bandwidth than the high-bandwidth codec for a similar quality communication). The filtered available bandwidth 210 may need to satisfy the channel bandwidth threshold (e.g., be below the first threshold value 310a or above the second threshold value 310b) for at least a predetermined period of time (e.g., 10 ms, 100 ms, 1 second, etc.). The channel bandwidth threshold and/or the predetermined period of time may be configurable (e.g., by the user 12 and/or based on the application).

The channel bandwidth threshold may be dependent upon which codec 180 is currently in use. Alternatively, the codec selector 170 uses a separate channel bandwidth threshold value for each codec 180. For example, when the user devices 10 are communicating via the second codec 180 (i.e., the codec selector 170 has already switched from the first codec 180 to the second codec 180), the codec selector 170 determines that the filtered available bandwidth 210 satisfies a second channel bandwidth threshold and switches the user devices 10 back to using the first codec 180 for the digital communication (e.g., establishes a third digital communication channel between the user devices 10 using the first codec 180).

In some examples, the filter input (e.g., the unfiltered estimated available bandwidth 162) may be "clipped" or limited to a maximum and/or minimum value (i.e., a clipped value). For example, the unfiltered estimated available bandwidth 162 may be limited to a maximum value of just above the second threshold value 310b and limited to a minimum value of just below the first threshold value 310a. Such limiting prevents the filtered output (e.g., the filtered available bandwidth 210) from straying too far above or too far below the thresholds 310 where the strong filter 220a is in operation. The strong filter 220a slows convergence and thus extreme values above and below the thresholds 310 may significantly delay codec switching. Put another way, the communication controller 150 determines the available bandwidth 162 satisfies a clipping threshold and, in response to determining the available bandwidth 162 satisfies the clipping threshold, adjusts the available bandwidth 162 to a clipped value, and thus the adaptive filter 200 filters the clipped value instead of the raw available bandwidth value.

As a specific example, the first threshold value 310a has a value of 100 kilobits per second (kbps) of estimated available bandwidth and the second threshold value 310b has a value of 200 kbps of estimated available bandwidth. When the estimated available bandwidth is 900 kbps, the adaptive filter 200 may instead limit the filter input to a value just above the second threshold value 310b (e.g., 220 kbps to 300 kbps). In this scenario, if the unfiltered estimated available bandwidth plummets from 900 kbps to 100 kbps, the filtered available bandwidth 210 will more quickly converge to below the second threshold value 310b, thus enabling the adaptive filter 200 to adaptively switch to the weak filter 220b. Similarly, when the unfiltered available bandwidth 162 is 10 kbps, the adaptive filter 200 may instead limit the filter input to a value just below the first threshold value 310a (e.g., 50 kbps to 90 kbps).

Figure 4:
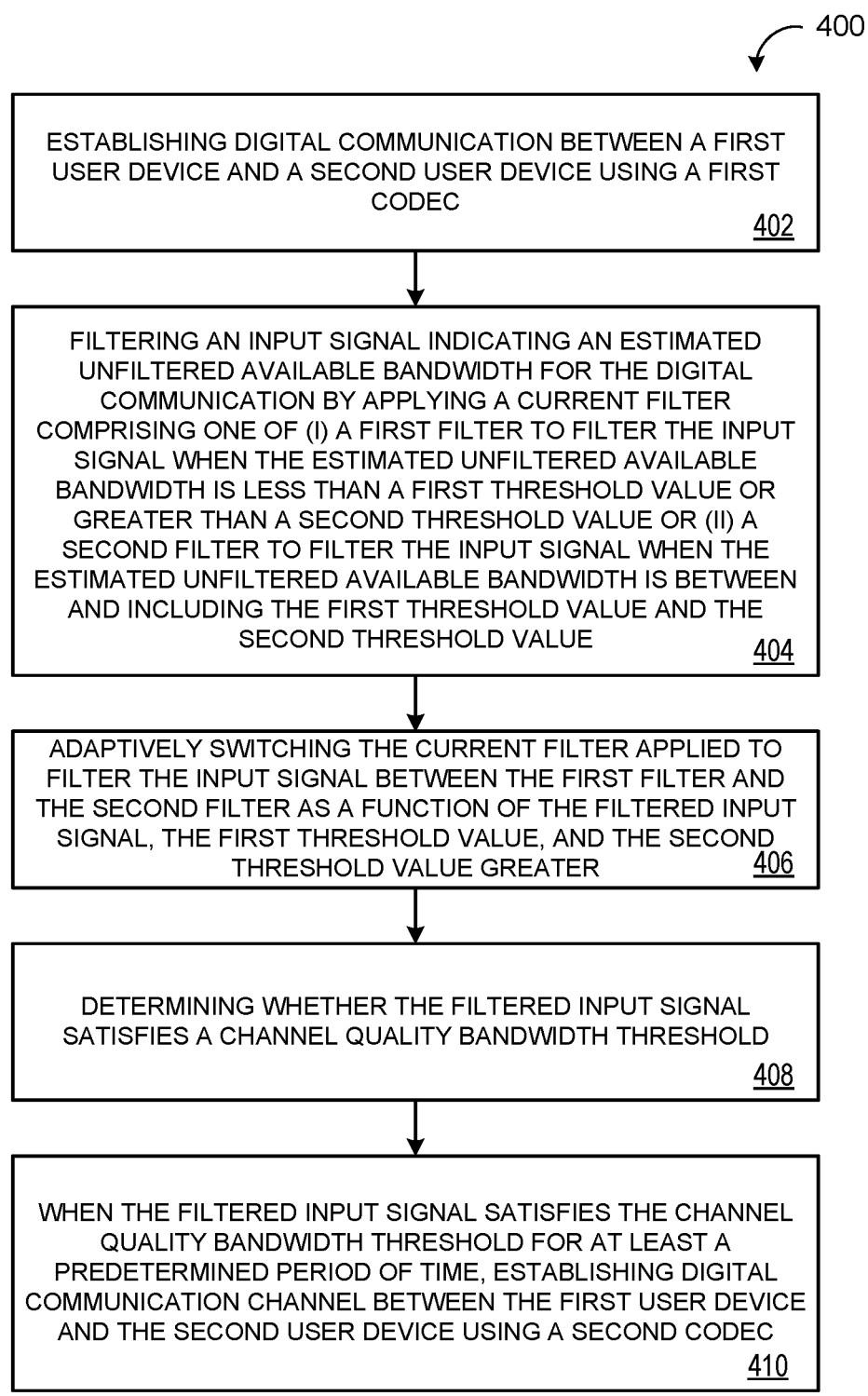
FIG. 4 is a flowchart of an example arrangement of operations for a method of establishing digital communications using an adaptive filter.

FIG. 4 is a flowchart of an exemplary arrangement of operations for a computer-implemented method 400 that, when executed by data processing hardware causes the data processing hardware to perform the operations for of adaptively selecting a filter for digital communications. The operations, at step 402, include establishing digital communication between a first user device 10a and a second user device 10b using a first codec 180. At step 404, the operations include filtering an input signal 162 indicating an estimated unfiltered available bandwidth for the digital communications by applying a current filter 220 including one of (i) a first filter 220a to filter the input signal 162 when the estimated unfiltered available bandwidth is less than a first threshold value 310a or greater than a second threshold value 310b or (ii) a second filter 220b to filter the input signal 162 when the estimated unfiltered available bandwidth is between and including the first threshold value 310a and the second threshold value 310b. At step 406, the operations include adaptively switching the current filter 220 applied to filter the input signal 162 between the first filter 220a and the second filter 220b as a function of the filtered input signal 162, the first threshold value 310a, and the second threshold value 310b. At step 408, the operations include determining whether the filtered input signal 210 satisfies a channel bandwidth threshold and, at step 410, when the filtered input signal 210 satisfies the channel bandwidth threshold for at least a predetermined period of time, switching from using the first codec to using a second codec for the digital communication between the first user device 10a and the second user device 10b.

Figure 5:
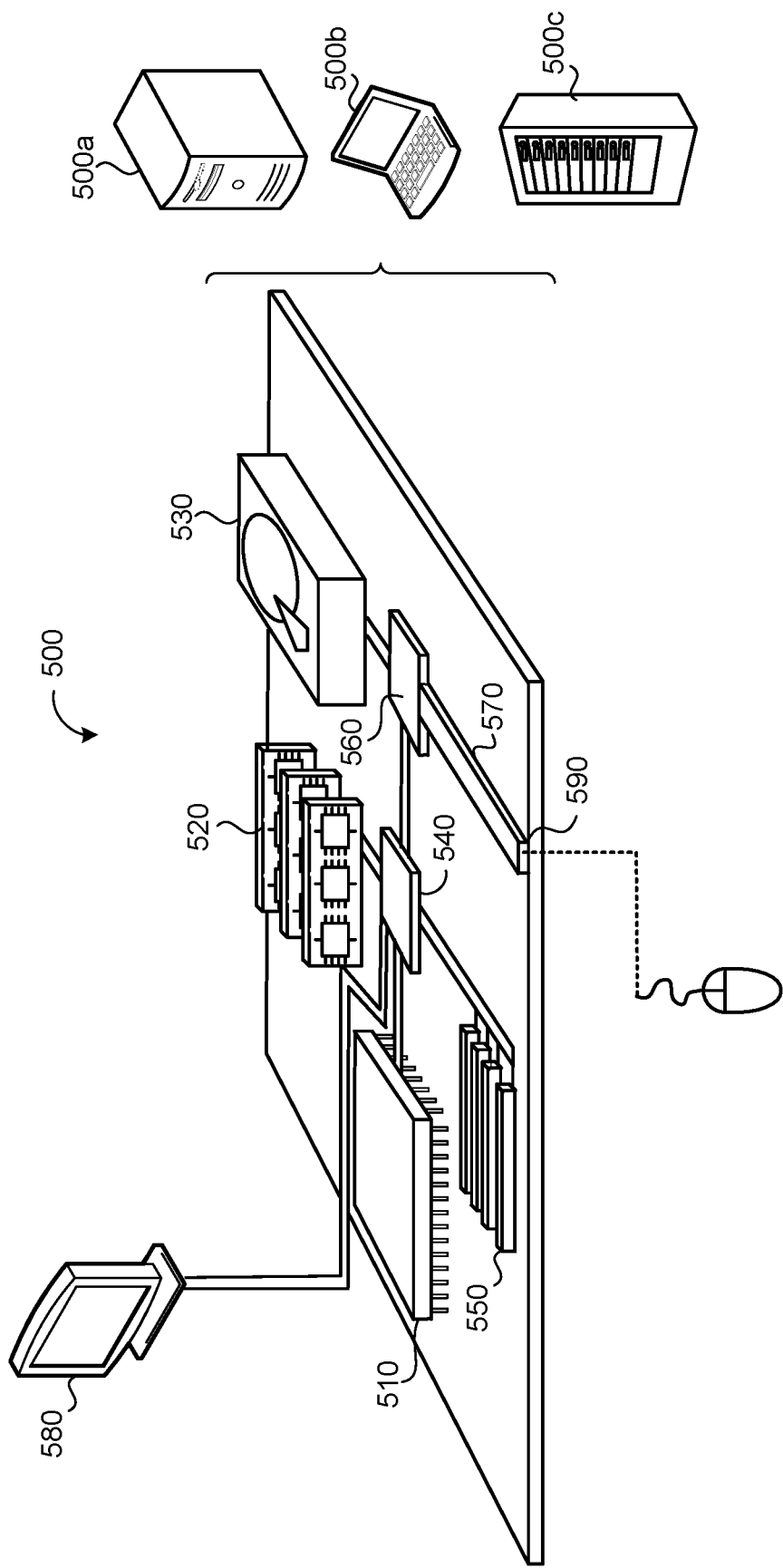
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    establishing digital communication between a first user device and a second user device using a first codec;
    filtering an input signal indicating an estimated unfiltered available bandwidth for the digital communication by applying a current filter comprising one of:
        a first filter to filter the input signal when the estimated unfiltered available bandwidth is less than a first threshold value or greater than a second threshold value; or
        a second filter to filter the input signal when the estimated unfiltered available bandwidth is between and including the first threshold value and the second threshold value;
    adaptively switching the current filter applied to filter the input signal between the first filter and the second filter as a function of the filtered input signal, the first threshold value, and the second threshold value;
    determining whether the filtered input signal satisfies a channel bandwidth threshold; and
    when the filtered input signal satisfies the channel bandwidth threshold for at least a predetermined period of time, switching from using the first codec to using a second codec for the digital communication between the first user device and the second user device.

2. The method of claim 1, wherein the operations further comprise, when the current filter applied to filter the input signal comprises the first filter:

determining that the filtered input signal rises to a value equal to or greater than the first threshold value, wherein adaptively switching the current filter applied to filter the input signal comprises switching from applying the first filter to applying the second filter to filter the input signal.

3. The method of claim 1, wherein the operations further comprise, when the current filter applied to filter the input signal comprises the first filter:

determining that the filtered input signal drops to a value equal to or less than the second threshold value, wherein adaptively switching the current filter applied to filter the input signal comprises switching from applying the first filter to applying the second filter to filter the input signal.

4. The method of claim 1, wherein the operations further comprise, when the current filter applied to filter the input signal comprises the second filter:

determining that the filtered input signal drops to a value less than the first threshold value, wherein adaptively switching the current filter applied to filter the input signal comprises switching from applying the second filter to applying the first filter to filter the input signal.

5. The method of claim 1, wherein the operations further comprise, when the current filter applied to filter the input signal comprises the second filter:

determining that the filtered input signal rises to a value greater than the second threshold value, wherein adaptively switching the current filter applied to filter the input signal comprises switching from applying the second filter to applying the first filter to filter the input signal.

6. The method of claim 1, wherein the first filter is associated with a stronger filter strength than the second filter.

7. The method of claim 1, wherein the channel bandwidth threshold is less than the first threshold value.

8. The method of claim 1, wherein:

the second codec requires less available bandwidth than the first codec for the same quality digital communication; and the filtered input signal satisfies the channel bandwidth threshold when the filtered input signal falls below the channel bandwidth threshold for the predetermined period of time.

9. The method of claim 1, wherein the first codec and the second code each comprise an audio codec or a video codec.

10. The method of claim 1, wherein the operations further comprise, after switching from using the first codec to using the second codec for the digital communication between the first user device and the second user device:

determining whether the filtered input signal satisfies a second channel bandwidth threshold; and when the filtered input signal satisfies the second channel bandwidth threshold for at least a second predetermined period of time, switching from using the second codec to using the first codec for the digital communication between the first user device and the second user device.

11. The method of claim 10, wherein the filtered input signal satisfies the second channel bandwidth threshold when the filtered input signal is above the second threshold value.

12. The method of claim 1, wherein the operations further comprise:

determining the input signal satisfies a clipping threshold; and in response to determining the input signal satisfies the clipping threshold, adjusting the input signal to a clipped value.

13. A system comprising:

data processing hardware; and memory hardware in communication with the data processing hardware, the memory hardware storing instructions that when executed on the data processing hardware cause the data processing hardware to perform operations comprising:

establishing digital communication between a first user device and a second user device using a first codec;

filtering an input signal indicating an estimated unfiltered available bandwidth for the digital communication by applying a current filter comprising one of:

a first filter to filter the input signal when the estimated unfiltered available bandwidth is less than a first threshold value or greater than a second threshold value; or a second filter to filter the input signal when the estimated unfiltered available bandwidth is between and including the first threshold value and the second threshold value;

adaptively switching the current filter applied to filter the input signal between the first filter and the second filter as a function of the filtered input signal, the first threshold value, and the second threshold value;

determining whether the filtered input signal satisfies a channel bandwidth threshold; and when the filtered input signal satisfies the channel bandwidth threshold for at least a predetermined period of time, switching from using the first codec to using a second codec for the digital communication between the first user device and the second user device.

14. The system of claim 13, wherein the operations further comprise, when the current filter applied to filter the input signal comprises the first filter:

determining that the filtered input signal rises to a value equal to or greater than the first threshold value, wherein adaptively switching the current filter applied to filter the input signal comprises switching from applying the first filter to applying the second filter to filter the input signal.

15. The system of claim 13, wherein the operations further comprise, when the current filter applied to filter the input signal comprises the first filter:

determining that the filtered input signal drops to a value equal to or less than the second threshold value, wherein adaptively switching the current filter applied to filter the input signal comprises switching from applying the first filter to applying the second filter to filter the input signal.

16. The system of claim 13, wherein the operations further comprise, when the current filter applied to filter the input signal comprises the second filter:

determining that the filtered input signal drops to a value less than the first threshold value, wherein adaptively switching the current filter applied to filter the input signal comprises switching from applying the second filter to applying the first filter to filter the input signal.

17. The system of claim 13, wherein the operations further comprise, when the current filter applied to filter the input signal comprises the second filter:

determining that the filtered input signal rises to a value greater than the second threshold value, wherein adaptively switching the current filter applied to filter the input signal comprises switching from applying the second filter to applying the first filter to filter the input signal.

18. The system of claim 13, wherein the first filter is associated with a stronger filter strength than the second filter.

19. The system of claim 13, wherein the channel bandwidth threshold is less than the first threshold value.

20. The system of claim 13, wherein:

the second codec requires less available bandwidth than the first codec for the same quality digital communication; and the filtered input signal satisfies the channel bandwidth threshold when the filtered input signal falls below the channel bandwidth threshold for the predetermined period of time.

21. The system of claim 13, wherein the first codec and the second code each comprise an audio codec or a video codec.

22. The system of claim 13, wherein the operations further comprise, after switching from using the first codec to using the second codec for the digital communication between the first user device and the second user device:

determining whether the filtered input signal satisfies a second channel bandwidth threshold; and when the filtered input signal satisfies the second channel bandwidth threshold for at least a second predetermined period of time, switching from using the second codec to using the first codec for the digital communication between the first user device and the second user device.

23. The system of claim 22, wherein the filtered input signal satisfies the second channel bandwidth threshold when the filtered input signal is above the second threshold value.

24. The system of claim 13, wherein the operations further comprise:

determining the input signal satisfies a clipping threshold; and in response to determining the input signal satisfies the clipping threshold, adjusting the input signal to a clipped value.

* * * * *